(12) United States Patent
Nakayama

(10) Patent No.: US 9,730,047 B2
(45) Date of Patent: *Aug. 8, 2017

(54) COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

(71) Applicant: NINTENDO CO., LTD., Kyoto (JP)

(72) Inventor: Satoshi Nakayama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 55 days.

This patent is subject to a terminal disclaimer.

(21) Appl. No.: 14/812,524

(22) Filed: Jul. 29, 2015

(65) Prior Publication Data

US 2015/0341776 A1 Nov. 26, 2015

Related U.S. Application Data

(63) Continuation of application No. 13/429,758, filed on Mar. 26, 2012, now Pat. No. 9,167,406.

(30) Foreign Application Priority Data

Jan. 6, 2012 (JP) ................................ 2012-001422

(51) Int. Cl.
*H04W 8/00* (2009.01)
*H04L 12/24* (2006.01)
(Continued)

(52) U.S. Cl.
CPC ............ *H04W 8/005* (2013.01); *H04L 41/12* (2013.01); *H04W 48/14* (2013.01); *H04W 72/02* (2013.01); *H04W 72/12* (2013.01); *H04W 48/00* (2013.01)

(58) Field of Classification Search
CPC ..... H04W 8/005; H04W 72/12; H04W 72/14; H04W 76/023; H04W 92/18;
(Continued)

(56) References Cited

U.S. PATENT DOCUMENTS

2005/0135318 A1 6/2005 Walton et al.
2006/0159041 A1 7/2006 Zhun
(Continued)

FOREIGN PATENT DOCUMENTS

JP 2007-519293 7/2007
JP 2008-109198 5/2008
(Continued)

OTHER PUBLICATIONS

Office Action in U.S. Appl. No. 13/431,384 dated Sep. 28, 2014.
(Continued)

*Primary Examiner* — Mirza Alam
(74) *Attorney, Agent, or Firm* — Nixon & Vanderhye P.C.

(57) ABSTRACT

An example system includes: a search communication apparatus searching for another communication apparatus; and search subject communication apparatuses searched for by the search communication apparatus. The search communication apparatus includes a search request transmission section transmitting a search request signal. The search subject communication apparatuses each includes: a search request reception section receiving the search request signal transmitted from the search communication apparatus; a search response transmission section transmitting a search response signal as response to the search request signal received by the search request reception section, to the search communication apparatus; and a search response monitoring section monitoring the search response signal transmitted from another search subject communication apparatus to the search communication apparatus. The search response transmission section transmits, as proxy response signal, to the search communication apparatus, the search response signal transmitted from the other search subject communication apparatus and monitored by the search response monitoring section.

11 Claims, 7 Drawing Sheets

(51) Int. Cl.
*H04W 72/12* (2009.01)
*H04W 72/02* (2009.01)
*H04W 48/14* (2009.01)
*H04W 48/00* (2009.01)

(58) Field of Classification Search
CPC ..... H04W 48/08; H04W 36/06; H04W 48/12; H04W 72/042; H04W 84/12; H04W 36/36; H04W 48/14; H04W 36/08; H04L 41/12; H04L 12/46; H04B 7/15
USPC ... 340/1.1, 572.1, 10.1, 286.02, 426.2, 7.29; 370/248, 328, 338, 420, 341, 458, 445, 370/353, 385; 455/434, 509, 41.2, 414.1; 709/225
See application file for complete search history.

(56) References Cited

U.S. PATENT DOCUMENTS

| | | | |
|---|---|---|---|
| 2006/0268802 A1* | 11/2006 | Faccin | H04L 12/46 370/338 |
| 2007/0213012 A1 | 9/2007 | Marin et al. | |
| 2008/0019287 A1 | 1/2008 | Hong | |
| 2008/0057936 A1 | 3/2008 | Oosawa | |
| 2008/0222478 A1* | 9/2008 | Tamaki | H04L 1/18 714/749 |
| 2009/0274083 A1 | 11/2009 | Wentink | |
| 2010/0120364 A1* | 5/2010 | Lee | H04W 8/005 455/41.2 |
| 2010/0232415 A1 | 9/2010 | Hayashino et al. | |
| 2010/0271959 A1* | 10/2010 | Qi | H04L 41/12 370/248 |
| 2010/0296434 A1* | 11/2010 | Amagai | H04W 48/12 370/315 |
| 2012/0120892 A1 | 5/2012 | Freda et al. | |
| 2013/0176099 A1 | 7/2013 | Nakayama | |

FOREIGN PATENT DOCUMENTS

| | | |
|---|---|---|
| JP | 2008-227642 | 9/2008 |
| JP | 2010/187147 | 8/2010 |
| JP | 2011-520359 | 7/2011 |
| WO | 2008/088190 | 7/2008 |

OTHER PUBLICATIONS

Office Action in U.S. Appl. No. 13/431,384 dated Apr. 25, 2014.
Office Action in U.S. Appl. No. 13/430,916 dated Jan. 6, 2014.
Office Action in U.S. Appl. No. 13/430,916 dated Jun. 13, 2014.
Search Report issued in European Application No. EP 12161260.0 dated May 7, 2013 (5 pages).

* cited by examiner

FIG. 6

| PROXY TARGET | REMAINING NUMBER OF TIMES OF PROXY RESPONSE |
|---|---|
| GAME APPARATUS A | 5 |
| GAME APPARATUS C | 5 |
| GAME APPARATUS D | 3 |
| ⋮ | ⋮ |

FIG. 7A

| FRAME TYPE | ADDRESS ID | TRANSMISSION SOURCE ID |
|---|---|---|

FIG. 7B

| FRAME TYPE | ADDRESS ID | TRANSMISSION SOURCE ID | NETWORK INFORMATION |
|---|---|---|---|

APPARATUS-RELATED INFORMATION (spans TRANSMISSION SOURCE ID and NETWORK INFORMATION)

FIG. 7C

| FRAME TYPE | ADDRESS ID | PROXY RESPONSE INFORMATION |
|---|---|---|

COMMUNICATION SYSTEM, COMMUNICATION APPARATUS, COMPUTER-READABLE STORAGE MEDIUM HAVING STORED THEREIN COMMUNICATION PROGRAM, AND COMMUNICATION METHOD

CROSS REFERENCE TO RELATED APPLICATION

This application is a continuation of U.S. application Ser. No. 13/429,758, filed Mar. 26, 2012 which claims priority to Japanese Patent Application No. 2012-001422, filed Jan. 6, 2012 and is incorporated herein by reference.

FIELD

The exemplary embodiments relate to a communication system, a communication apparatus, a computer-readable storage medium having stored therein a communication program, and a communication method.

BACKGROUND AND SUMMARY

Conventionally, in a communication system, a communication apparatus performing wireless communication may execute scanning for searching for a connection destination. For example, in such a communication system, when a communication apparatus searches for (scans) other communication apparatuses around the communication apparatus, the communication apparatus (hereinafter, a communication apparatus that searches for other communication apparatuses is referred to as a search communication apparatus) transmits a search request signal (probe request) to other communication apparatuses (hereinafter, a communication apparatus that is searched for is referred to as a search subject communication apparatus) by broadcast. Then, a search subject communication apparatus that has received the search request signal transmits a search response signal (probe response) indicating the presence of the search subject communication apparatus, as a response to the search request signal, to the search communication apparatus which has transmitted the search request signal. Then, the search communication apparatus receives the search response signal, thereby recognizing the presence of the search subject communication apparatus.

However, in such a communication system as described above, in order to find a large number of other communication apparatuses, the search communication apparatus is to sequentially receive search response signals respectively transmitted from the large number of other communication apparatuses, and therefore, it takes long time for the searching. That is, the search communication apparatus cannot search for a large number of other communication apparatuses in a short period. Therefore, the efficiency of the searching cannot be increased.

Therefore, a feature of the exemplary embodiments provides a communication system, a communication apparatus, a computer-readable storage medium having stored therein a communication program, and a communication method that have increased efficiency of searching when a communication apparatus searches for another communication apparatus.

The exemplary embodiments have the following aspects in order to solve the above problem.

A communication system according to one aspect of the exemplary embodiments includes: a search communication apparatus which searches for another communication apparatus; and a plurality of search subject communication apparatuses which are searched for by the search communication apparatus. The search communication apparatus comprises a search request transmission section configured to transmit a search request signal. The search subject communication apparatuses each comprises: a search request reception section configured to receive the search request signal transmitted from the search communication apparatus; a search response transmission section configured to transmit a search response signal which is a response to the search request signal received by the search request reception section, to the search communication apparatus; and a search response monitoring section configured to monitor the search response signal transmitted from another search subject communication apparatus to the search communication apparatus. The search communication apparatus further comprises a search response reception section configured to receive the search response signal transmitted from the search subject communication apparatus. The search response transmission section transmits, as a proxy response signal, to the search communication apparatus, the search response signal monitored by the search response monitoring section, which has been transmitted from the other search subject communication apparatus. The search response reception section receives the proxy response signal in addition to the search response signal.

According to the above aspect, the search subject communication apparatus monitors search response signals transmitted from other search subject communication apparatuses to the search communication apparatus, and transmits the monitored search response signals as a proxy response signal, to the search communication apparatus. Therefore, the search communication apparatus can recognize the presences of a plurality of search subject communication apparatuses by receiving a proxy response signal transmitted from one search subject communication apparatus. Thus, the efficiency of searching is increased.

In another aspect, the proxy response signal may be one signal obtained by integrating the search response signal transmitted from the search subject communication apparatus to the search communication apparatus, and the search response signal monitored by the search response monitoring section, which has been transmitted from the other search subject communication apparatus.

According to the above aspect, the proxy response signal is transmitted including several signals integrated. Therefore, the search communication apparatus can recognize the presences of a plurality of search subject communication apparatuses by only receiving the one proxy response signal. That is, the search communication apparatus can recognize the presences of a plurality of search subject communication apparatuses in a shorter reception time than the total reception time for sequentially receiving search response signals transmitted from the search subject communication apparatuses. Therefore, the search communication apparatus can recognize the presences of a plurality of search subject communication apparatuses in a shorter period, and thus, the efficiency of searching is increased.

In another aspect, the search response monitoring section may monitor the proxy response signal transmitted from another search subject communication apparatus. In this case, when the search response signal transmitted from the search subject communication apparatus is included in the proxy response signal monitored by the search response monitoring section of the search subject communication apparatus, the search response transmission section of the search subject communication apparatus does not transmit the search response signal.

According to the above aspect, if a search response signal of a search subject communication apparatus is included in a proxy response signal transmitted from another search subject communication apparatus, the search subject communication apparatus does not transmit a search response signal. Therefore, the search communication apparatus can avoid redundantly receiving the same search response signals. Thus, the efficiency of searching is increased.

In another aspect, the search subject communication apparatuses may each further comprise a priority setting section configured to set a priority of transmission of the search response signal. The priority setting section may set the priority as follows. If the search subject communication apparatus has transmitted the search response signal to the search communication apparatus at least one time, the priority setting section sets the priority to be lower than if the search subject communication apparatus has not transmitted the search response signal. In this case, the search response transmission sections of the search subject communication apparatuses transmit the search response signals in the order corresponding to the priorities that have been set.

According to the above aspect, the priority of transmission of a search response signal of a search subject communication apparatus that has transmitted a search response signal at least one time is set to be lower than the priority of a search subject communication apparatus that has not transmitted a search response signal. Therefore, a search subject communication apparatus that has not yet been recognized by the search communication apparatus preferentially transmits a search response signal in preference to other search subject communication apparatuses. Thus, the efficiency of searching by the search communication apparatus is increased.

In another aspect, the search subject communication apparatuses may each further comprise a priority setting section configured to set a priority of transmission of the search response signal. The priority setting section may set the priority as follows. The more the number of other search subject communication apparatuses that have transmitted the search response signals monitored by the search response monitoring section and included in the proxy response signal is, the higher the priority setting section sets the priority to be. In this case, the search response transmission sections of the search subject communication apparatuses transmit the search response signals in the order corresponding to the priorities that have been set.

According to the above aspect, the more the number of other search subject communication apparatuses that have transmitted search response signals included in a proxy response signal to be transmitted by a search subject communication apparatus is (that is, the more the number of other search subject communication apparatuses whose search response signals are to be transmitted by a search subject communication apparatus in place of the other search subject communication apparatuses is), the more preferentially a search response signal (the proxy response signal) of the search subject communication apparatus is transmitted. Therefore, the search communication apparatus can recognize the presences of a large number of search subject communication apparatuses in a short period, and thus, the efficiency of searching is increased.

In another aspect, the search subject communication apparatuses may each further comprise: a proxy registration section and a proxy deletion section. The proxy registration section registers, in a storage section of the search subject communication apparatus, information about the other search subject communication apparatus that has transmitted the search response signal monitored by the search response monitoring section. The proxy deletion section deletes the information about the other search subject communication apparatus which has been registered by the proxy registration section, from the storage section. In this case, the search response transmission section transmits the proxy response signal, based on the information about the other search subject communication apparatus registered in the storage section.

According to the above aspect, a search subject communication apparatus can appropriately manage pieces of information about other search subject communication apparatuses that have transmitted search response signals monitored by the search subject communication apparatus, and transmit a proxy response signal, based on the currently stored pieces of information about the other search subject communication apparatuses.

In another aspect, when a predetermined time has elapsed since the proxy registration section registered the information about the other search subject communication apparatus in the storage section, the proxy deletion section may delete the information about the other search subject communication apparatus from the storage section.

According to the above aspect, information about another search subject communication apparatus that has transmitted a search response signal monitored by the search subject communication apparatus is deleted from the storage section when a predetermined time has elapsed. Therefore, while transmitting a proxy response signal based on the currently stored pieces of information about other search subject communication apparatuses, the search subject communication apparatus can prevent cumulative increase in the number of proxy targets included in the proxy response signal (the number of search response signals of other search subject communication apparatuses for which proxy response is performed).

In another aspect, when the search response transmission section has transmitted, a predetermined number of times, as the proxy response signal, the search response signal monitored by the search response monitoring section, the proxy deletion section may delete the information about the other search subject communication apparatus that has transmitted the search response signal, from the storage section.

According to the above aspect, if a monitored search response signal has been transmitted as a proxy response signal a predetermined number of times, information about a search subject communication apparatus that has transmitted the monitored search response signal is deleted from the storage section. Therefore, while transmitting a proxy response signal based on the currently stored pieces of information about other search subject communication apparatuses, the search subject communication apparatus can avoid continuously transmitting, more than a predetermined number of times, a search response signal of another search subject communication apparatus that has been already transmitted as a proxy response signal the predetermined number of times.

In another aspect, when the search request reception section has received the search request signal, the search response monitoring section may start to monitor the search response signal transmitted from the other search subject communication apparatus.

According to the above aspect, when a search subject communication apparatus has recognized that the search communication apparatus is searching, the search subject communication apparatus starts to monitor search response signals transmitted from other search subject communication apparatuses. Therefore, the search subject communication apparatus can start the monitoring at an appropriate timing without unnecessary monitoring. As used herein, starting the monitoring means starting to receive a signal from a search subject communication apparatus and determine whether or not to transmit the signal as a proxy response signal.

In the above, the exemplary embodiments are described using a communication system as an example. However, the exemplary embodiments may be applied to a communication apparatus, a computer-readable storage medium having stored therein a communication program, or a communication method.

According to the exemplary embodiments, it is possible to provide a communication system and the like that have increased efficiency of searching when a communication apparatus searches for another communication apparatus.

These and other objects, features, aspects and advantages of the exemplary embodiments will become more apparent from the following detailed description when taken in conjunction with the accompanying drawings.

BRIEF DESCRIPTION OF THE DRAWINGS

FIG. 6 shows a non-limiting example of a proxy target management table;

FIG. 7A, FIG. 7B and FIG. 7C show non-limiting examples of frames;

DETAILED DESCRIPTION OF NON-LIMITING EXAMPLE EMBODIMENTS

Embodiment

Hereinafter, an embodiment will be described with reference to the drawings. In the present embodiment, a communication system will be described as an example, but the exemplary embodiments are not limited thereto. A communication apparatus that realizes the function of such a communication system, a communication method performed in such a communication system, or a computer-readable storage medium having stored therein a communication program to be executed in such a communication system, may be used.

Configuration of Hardware of Game Apparatus

The communication system of the present embodiment is composed of a plurality of communication apparatuses capable of performing wireless communication. In the present embodiment, a game apparatus 10 of hand-held type having a wireless communication function is used as an example of the communication apparatus.

Figure 1:
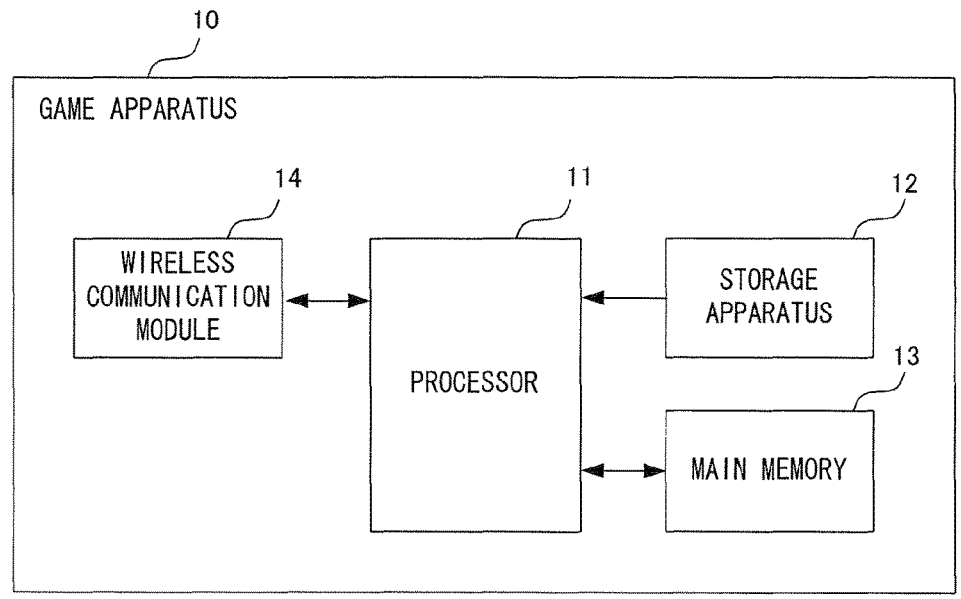
FIG. 1 is a block diagram showing a non-limiting example of the configuration of a game apparatus 10.

FIG. 1 is a block diagram showing a non-limiting example of the configuration of the game apparatus 10. As shown in FIG. 1, the game apparatus 10 includes a processor 11, a storage apparatus 12, a main memory 13, and a wireless communication module 14.

The storage apparatus 12 has stored therein a computer program that is executed by the processor 11. The storage apparatus 12 is, typically, a hard disk or a ROM (Read Only Memory). The main memory 13 temporarily stores a computer program or various data, and also functions as a work area of the processor 11. It is noted that a computer program or data stored in an external storage apparatus may be provided via a communication line or the like to the main memory 13 or the storage apparatus 12, so that the main memory 13 or the storage apparatus 12 stores it.

In addition, the main memory 13 stores a transmission frame or the like in which data to be transmitted to another game apparatus 10 or the like is written. The transmission frame stored in the main memory 13 is outputted to the wireless communication module 14, in accordance with an instruction from the processor 11, and is transmitted via the wireless communication module 14 to another game apparatus 10 or the like. In addition, a reception frame in which data received via the wireless communication module 14 from another game apparatus 10 or the like is written is processed by the processor 11, and is stored in the main memory 13 as appropriate. In addition, the storage apparatus 12 of the game apparatus 10 has stored therein apparatus information (apparatus ID) which is identification information about the game apparatus 10, in a nonvolatile manner. The apparatus ID is written as a transmission source ID in the transmission frame when the transmission frame is transmitted to another game apparatus 10 or the like.

The wireless communication module 14 has a function of establishing connection to a wireless LAN, thereby performing wireless communication with other game apparatuses 10 of the same type, or transmitting data to or receiving data from other apparatuses via the Internet. The wireless communication module 14 outputs the reception frame that has been received, to the processor 11. In addition, the wireless communication module 14 transmits the transmission frame or the like to another game apparatus 10 or the like, as instructed by the processor 11. It is noted that the wireless communication module 14 performs wireless communication by using a channel (frequency band) designated in accordance with the ambient communication condition by the processor 11.

It is noted that the above-described configuration of hardware is merely an example. The exemplary embodiments are applicable to any communication apparatus, or any communication system including any communication apparatuses.

Summary of Communication System

Figure 2:
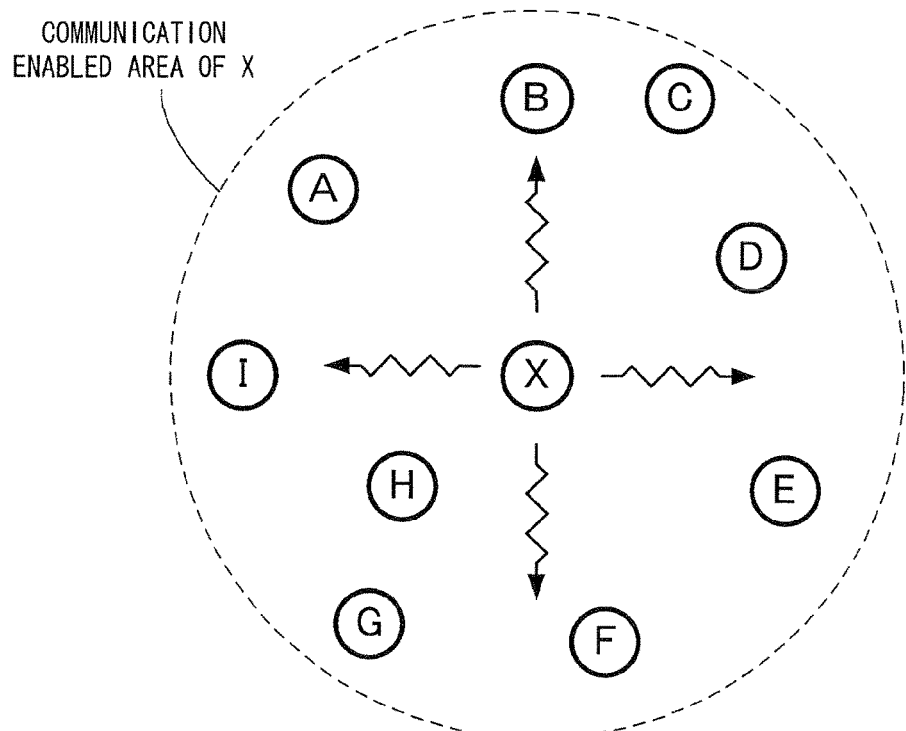
FIG. 2 is a conceptual diagram showing a non-limiting example of wireless communication performed in a communication system including a plurality of the game apparatuses 10.

First, the summary of a communication system of the present embodiment will be described. FIG. 2 is a conceptual diagram showing a non-limiting example of wireless communication performed in the communication system including a plurality of the game apparatuses 10 (game apparatuses X and A to I).

As shown in FIG. 2, in the communication enabled area in which wireless communication with the game apparatus X can be performed, the other game apparatuses A to I are present. When the game apparatus X searches for a game apparatus 10 that the game apparatus X can communicate with around the game apparatus X, the game apparatus X transmits a transmission frame (search request signal) indicating the presence of the game apparatus X and the content of the search request, by broadcast. That is, in the present embodiment, the game apparatus X functions as a search communication apparatus. Here, a channel used for wireless communication by the game apparatus 10 (use channel) is selected from predetermined several channels (for example, 1Ch, 2Ch, and 3Ch) set in the communication system, in accordance with the ambient communication condition (for example, radio wave usage rate of the channel). Hereinafter, it will be assumed that a channel used by the game apparatus X for transmitting a search request signal is 2Ch, and that channels used by the game apparatuses A to I (search subject communication apparatuses in the present embodiment) are also 2Ch. It is noted that, in the following description, a channel (2Ch) used by a game apparatus for transmitting a search request signal for searching for another game apparatus is referred to as a search channel.

Here, in order to recognize the presence of another game apparatus 10, the game apparatus X is to receive a search response signal which is a response to a search request signal that the game apparatus X has transmitted. That is, in order to recognize the presences of all the game apparatuses A to I, the game apparatus X is to receive all the search response signals sequentially transmitted from the game apparatuses A to I. Therefore, the more the number of the game apparatuses 10 to be searched for is (the more the number of search subject communication apparatuses is), the longer the time taken for the game apparatus X to receive search response signals from all the game apparatuses 10 is. Meanwhile, the game apparatus X can spend only a short time on searching, owing to another transmission process, for example. In such a case, it is preferable that the game apparatus X can search for a large number of game apparatuses in a short time (that is, it is preferable that the efficiency of searching is increased). Therefore, in the communication system of the present embodiment, one search subject communication apparatus transmits search response signals of other search subject communication apparatuses in place of the other search subject communication apparatuses, thereby increasing the efficiency of the searching. Hereinafter, the feature of the communication system of the present embodiment will be described with reference to the drawings.

First, as shown in FIG. 2, the game apparatus X transmits the first search request signal to the game apparatuses A to I. The game apparatuses A to I receive the search request signal from the game apparatus X. Then, each of the game apparatuses A to I transmits a search response signal to the game apparatus X, or when the game apparatus does not transmit a search response signal, monitors signals around the game apparatus. Here, it will be assumed that the game apparatuses A, C, D, F, G, and I have received the first search request signal and the game apparatuses B, E, and H have not normally received the search request signal. Here, since the game apparatuses A, C, D, F, G, and I transmit the search response signals to the same game apparatus (game apparatus X), the order of the transmission of the search response signals is determined based on priorities described later, such that the plurality of search response signals will not collide with each other. If some game apparatuses have the same priories, back-off times (waiting times for transmission) are randomly determined, so that the game apparatuses transmit search response signals in order of the waiting times, starting from the shortest one. For example, if the order of the waiting times of the game apparatuses are, starting from the shortest one, A, C, D, F, G, and then I, first, the game apparatus A transmits a search response signal. At this time, each of the other game apparatuses B to I monitors signals around itself. For example, the game apparatuses B, C, I, and II monitor the search response signal transmitted from the game apparatus A. Next, the game apparatus C transmits a search response signal. At this time, each of the other game apparatuses A, B, and D to I monitors signals around itself. For example, the game apparatuses A, B, and D monitor the search response signal transmitted from the game apparatus C. Thus, the game apparatuses A to I that have received the search request signal sequentially transmit search response signals based on the waiting times for transmission, or when each of them does not transmit a search response signal, the game apparatus monitors search response signals around the game apparatus (search response signals in the monitoring area), thereby recognizing the presences of other game apparatuses around the game apparatus.

Figure 3:
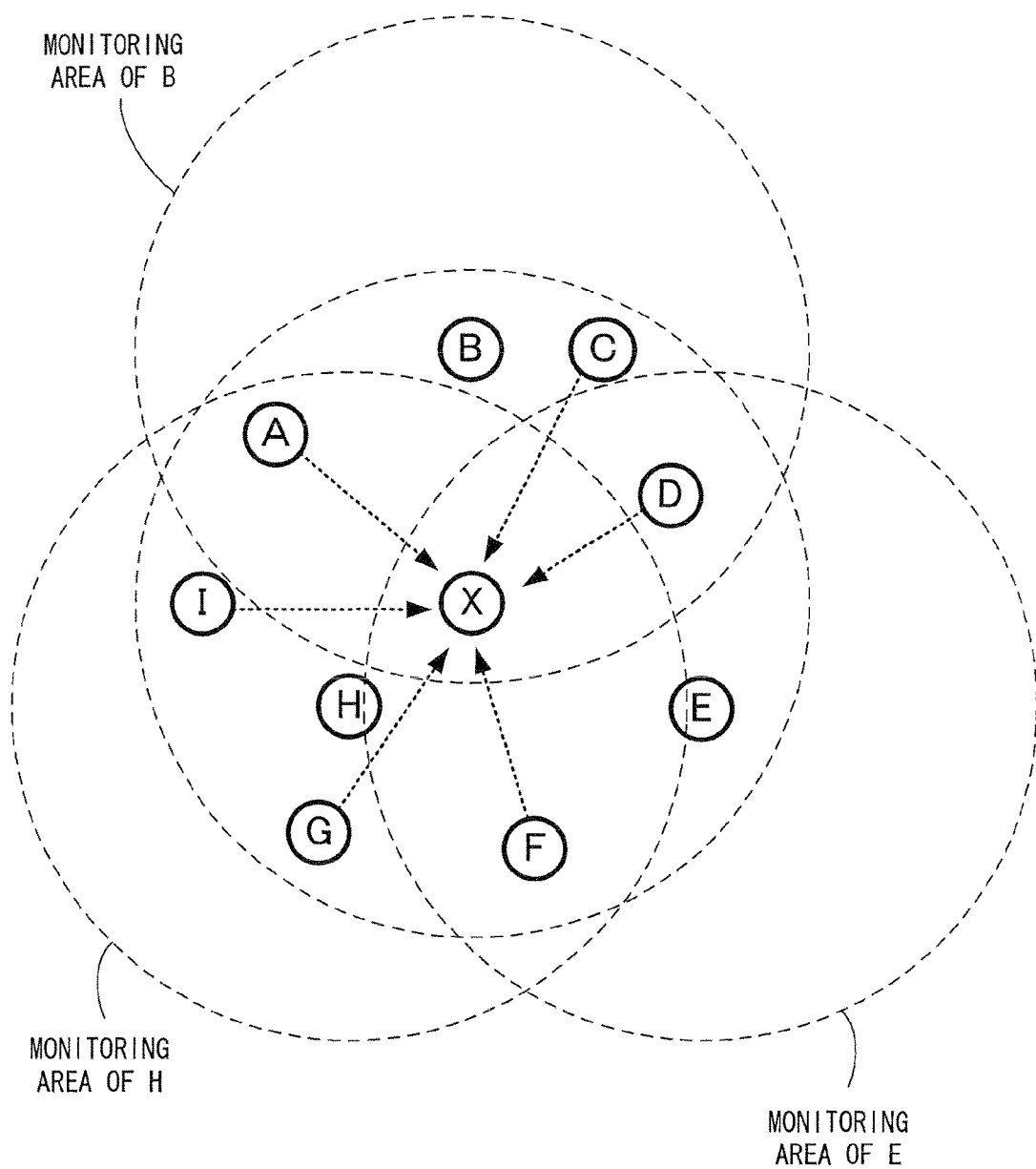
FIG. 3 is a conceptual diagram showing a non-limiting example of wireless communication performed in the communication system including the plurality of game apparatuses 10.

The game apparatuses B, E, and H do not transmit search response signals because they have not normally received the search request signal from the game apparatus X. Therefore, as shown in FIG. 3, when the game apparatuses A, C, D, F, G, and I have transmitted search response signals, the game apparatus B has monitored the search response signals transmitted from the game apparatuses A, C, and D which are present in the monitoring area of the game apparatus B, the game apparatus E has monitored the search response signals transmitted from the game apparatuses D and F which are present in the monitoring area of the game apparatus E, and the game apparatus H has monitored the search response signals transmitted from the game apparatuses A, I, G, and F which are present in the monitoring area of the game apparatus H.

It is noted that the search response signals transmitted from the game apparatuses A, C, D, F, G, and I may not received by the game apparatus X. For example, the game apparatus X can spend only a short time on the searching, and therefore, a reception enabled period in which the game apparatus X can receive a search response signal as a response to a search request signal that the game apparatus X has transmitted might be short. Specifically, after the reception enabled period has elapsed, a search channel might be occupied by another communication, or the search channel might be switched to different channel, and as a result, a search communication apparatus (game apparatus X) might be unable to receive the search response signal. Even in such a case, if another game apparatus 10 can monitor the search response signal that the game apparatus X has not received, when the other game apparatus 10 has next received the search request signal, the other game apparatus 10 transmits a proxy response signal described later, thereby allowing the game apparatus X to receive the search response signal that the game apparatus X has not received.

Figure 4:
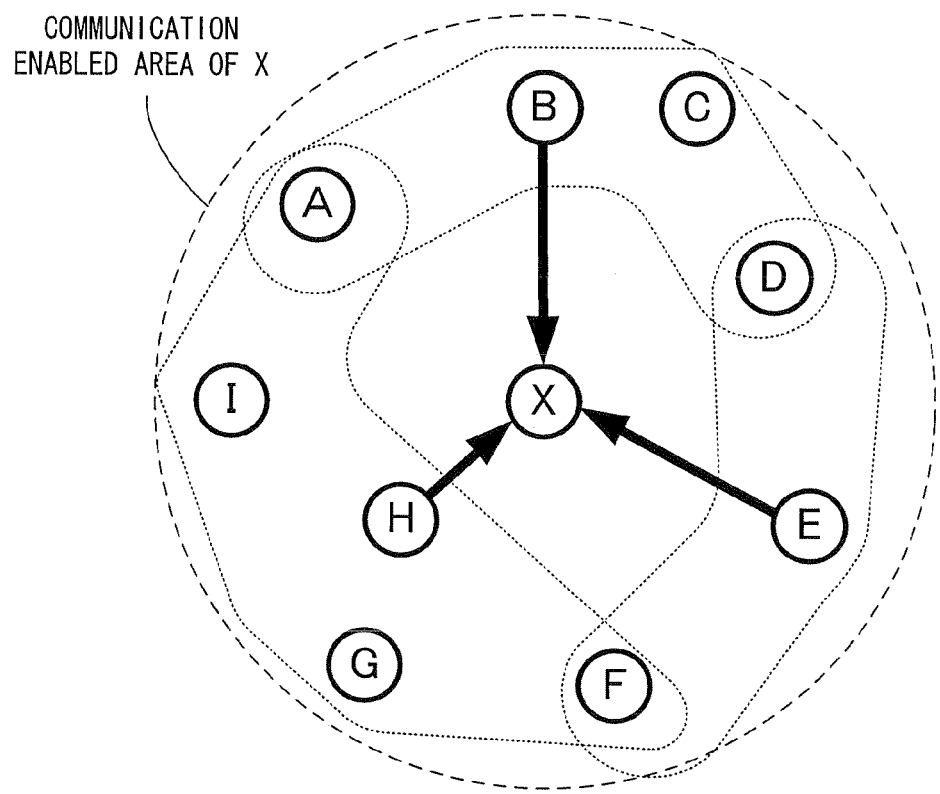
FIG. 4 is a conceptual diagram showing a non-limiting example of wireless communication performed in the communication system including the plurality of game apparatuses 10.

Next, the game apparatus X transmits the second search request signals to the game apparatuses A to I. The game apparatuses A to I receive the second search request signal. Here, the priorities of the game apparatuses A, C, D, F, G, and I which have transmitted the search response signals as responses to the first search request signal transmitted from the game apparatus X are set to be lower than a reference value, and therefore, the priorities of the game apparatuses B, E, and H become relatively high. Here, as shown in FIG. 4, each of the game apparatuses B, E, and H which have monitored the search response signals transmitted from the other game apparatuses 10 transmits the monitored search response signals and its own search response signal, as a proxy response signal, to the game apparatus X. Specifically, for example, the game apparatus B transmits its own search response signal and the search response signals transmitted from the game apparatuses A, C, and D, as a series of proxy response signals. Therefore, it is not necessary to provide back-off times (waiting times for transmission) for adjusting the transmission such that the search response signals sequentially transmitted from the game apparatuses A, B, C, and D will not collide with each other, and as a result, the time taken for the transmission of a search response signal becomes short. Therefore, by receiving the proxy response signals from the game apparatus B, the game apparatus X can recognize the presences of the game apparatuses A. B, C, and D in a short time, thus increasing the efficiency of searching. In addition, by transmitting a plurality of search response signals as proxy response signals as described above, the rate that search response signals transmitted from the game apparatuses A to I are normally received by the game apparatus X (reaching rate) increases. Therefore, it is not necessary for the game apparatuses A to I to retransmit the search response signals in order to cause the search response signals to reach the game apparatus X, and occurrence of fruitless transmission can be prevented. As a result, the time taken for the game apparatus X to perform searching is further reduced.

It is noted that the above proxy response signals may be one signal including, in an integrated manner, a search response signal of a game apparatus and search response signals that the game apparatus has monitored. Specifically, the proxy response signal may be a signal obtained by integrating the body portions of these search response signals and providing a common header portion. In this case, the amount of entire information to be transmitted decreases. Therefore, the time taken for transmission and reception is further reduced, and the efficiency of searching is further increased. Hereinafter, it will be assumed that the proxy response signal is one signal including, in an integrated manner, a search response signal of a game apparatus and search response signals that the game apparatus has monitored.

As shown in FIG. 4, the game apparatuses A, C, D, F, G, and I do not transmit search response signals with respect to the second search request signal that they have received. The reason is as follows. The game apparatuses A, C, D, F, G, and I have already transmitted search response signals with respect to the first search request signal (see FIG. 3). Therefore, the priorities of transmission of search response signals of the game apparatuses A, C, D, F, G, and I are set to be lower than those of the other game apparatuses that have not transmitted search response signals with respect to the first search request signal (game apparatuses B, E, and H, or a game apparatus 10 that has newly appeared in the communication enabled area of the game apparatus X). Then, the game apparatuses A, C, D, F, G, and I having such low priorities of transmission monitor signals around the game apparatuses A, C, D, F, G, and I before transmitting search response signals. Here, a proxy response signal as well as search response signals is monitored. Therefore, for example, the game apparatus A monitors a proxy response signal transmitted by the game apparatus B, and confirms that the search response signal that the game apparatus A has already transmitted is included in the proxy response signal. In this case, the game apparatus A can allow the game apparatus X to recognize the presence of the game apparatus A by the proxy response signal from the game apparatus B being received by the game apparatus X, and therefore, the game apparatus A does not transmit a search response signal. Thus, search response signals can be prevented from being redundantly transmitted from the same game apparatus in a short time in which the game apparatus X can receive search response signals, whereby the efficiency of searching is increased. On the other hand, as a result of the game apparatus A monitoring the proxy response signal from the game apparatus B, if the search response signal of the game apparatus A is not included in the proxy response signal, proxy response is not performed for the game apparatus A, and therefore, the game apparatus A transmits a search response signal at its transmission timing based on the set priority. Alternatively, as a result of the game apparatus A monitoring the proxy response signal from the game apparatus B, if the search response signal of the game apparatus A is included in the proxy response signal, the priority of the game apparatus A may be further lowered instead of not transmitting a search response signal.

It is noted that also the proxy response signals from the game apparatuses B, E, and H are transmitted in the order corresponding to priorities. The more the number of game apparatuses that have transmitted search response signals included in a proxy response signal is, the higher the priority of transmission of the proxy response signal is set to be. Specifically, the game apparatus B transmits three search response signals of the game apparatuses A, C, and D in place of them, the game apparatus E transmits two search response signals of the game apparatuses F and D in place of them, and the game apparatus H transmits four search response signals of the game apparatuses A, F, G, and I in place of them. Therefore, the order of the priorities is, starting from the highest one, the game apparatus H, the game apparatus B, and then the game apparatus E. Therefore, the proxy response signals are transmitted in the order of game apparatus H, B, and then E. As a result, even if the period in which the game apparatus X can receive a search response signal has ended in a short period, the game apparatus X can receive search response signals of as many communication apparatuses as possible in this short period, whereby the efficiency of searching is increased.

In addition, each of the game apparatuses A to I clears search response signals that the game apparatus has monitored, in accordance with a predetermined condition. For example, each of the game apparatuses A to I may clear the monitored search response signals if the game apparatus has performed proxy response a predetermined number of times (that is, the game apparatus has transmitted a proxy response signal including the monitored search response signals a predetermined number of times), may clear them if a predetermined period has elapsed, or may clear them if the radio wave reception intensity has weakened in the monitoring.

Memory Map

Figure 5:
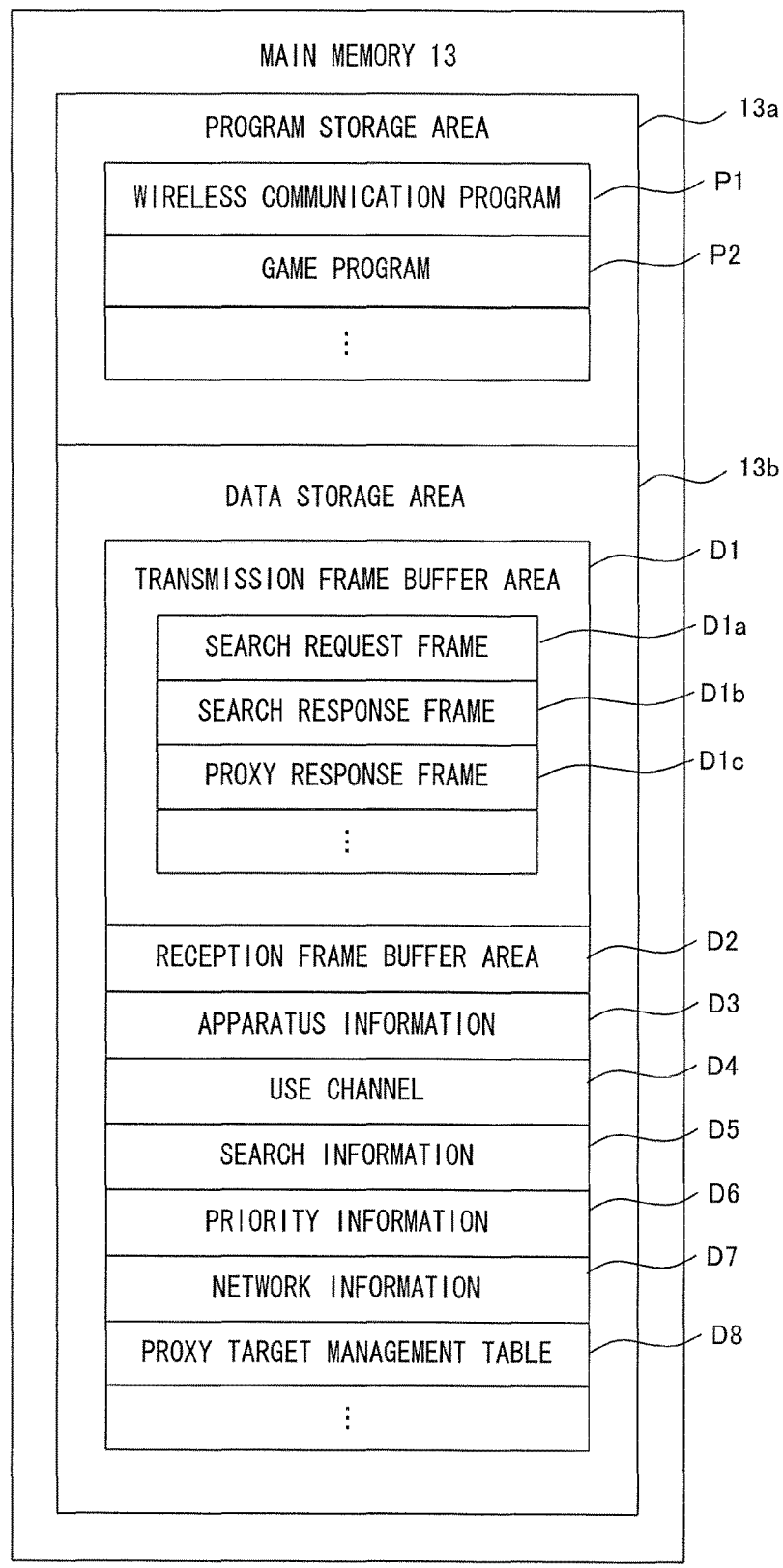
FIG. 5 shows a non-limiting example of a memory map of a main memory 13.

Next, with reference to FIG. 5, various programs and various pieces of data to be stored in the main memory 13 (i.e., the memory map) will be described. As shown in FIG. 5, the main memory 13 includes: a program storage area 13*a* in which a program loaded from the storage apparatus 12, a program acquired via communication lines from an external storage apparatus, or the like is to be stored; and a data storage area 13b in which temporary data generated in a game process or a communication process is to be stored.

A wireless communication program P1, a game program P2, and the like are to be stored in the program storage area 13a. The wireless communication program P1 is a program defining the whole wireless communication process. If execution of the wireless communication program P1 is started, the wireless communication process is started. The game program P2 is a program defining the whole game process executed by the game apparatus 10.

The data storage area 13b includes a transmission frame buffer area D1 and a reception frame buffer area D2. Apparatus information D3, use channel information D4, search information D5, priority information D6, network information D7, a proxy target management table D8, and the like are to be stored in the data storage area 13b.

A search request frame D1a, a search response frame D1b, a proxy response frame D1c, and the like are to be stored in the transmission frame buffer area D1. When the game apparatus 10 transmits data to another game apparatus 10, a transmission frame prepared in the transmission frame buffer area D1 is used. The reception frame buffer area D2 is a buffer area for, when the transmission frame transmitted from another game apparatus 10 has been received, temporarily storing the transmission frame.

The apparatus information D3 is identification information (ID information) of the game apparatus 10. The use channel information D4 indicates a channel used when the game apparatus 10 communicates with another game apparatus 10. The search information D5 is identification information about a communication game (an example of applications) executed by the game apparatus 10. The priority information D6 indicates the priority for determining the order of transmission of a transmission frame or the like to another game apparatus 10. The network information D7 is information about a network that the game apparatus 10 forms together with another game apparatus 10 (for example, information about the total number of the game apparatuses 10 included in the same network).

The proxy target management table D8 is used when the game apparatus 10 transmits a proxy response signal in place of another game apparatus 10 to a search communication apparatus, and is set for each search communication apparatus. FIG. 6 shows a non-limiting example of the proxy target management table of the game apparatus. B set for the game apparatus X (search communication apparatus). As shown in FIG. 6, proxy targets (the other game apparatuses A, C, D, etc.), and the numbers of times of proxy response for the respective proxy targets are registered in the proxy target management table. Based on the proxy target management table, the game apparatus B transmits search response signals of other game apparatuses in place of the other game apparatuses respective predetermined numbers of times.

Structure of Transmission Frame

Next, with reference to FIG. 7A, FIG. 7 B and FIG. 7 C, the structures of the transmission frames will be described. FIG. 7A shows a non-limiting example of the structure of the search request frame D1a, FIG. 7B shows a non-limiting example of the structure of the search response frame D1b, and FIG. 7C shows a non-limiting example of the structure of the proxy response frame D1c.

The search request frame D1a is transmitted as a search request signal by broadcast when the game apparatus 10 searches for another game apparatus 10. As shown in FIG. 7A, the search request frame D1a includes a frame type, an address ID, and a transmission source ID. The frame type indicates the type of the transmission frame. In this case, information indicating the search request frame D1a is written in the frame type. In the address ID, identification information about another game apparatus 10 as a transmission destination is written. Since the search request frame D1a is transmitted by broadcast, identification information that allows all the game apparatuses 10 to receive the frame is written in the address ID. In the transmission source ID, identification information about the game apparatus 10 that transmits the search request frame D1a is written based on the apparatus information D3 stored in the data storage area 13b.

The search response frame D1b is transmitted by the game apparatus 10 that has received the search request frame D1a, to the game apparatus 10 that has transmitted the search request frame D1a. As shown in FIG. 7B, the search response frame D1b includes a frame type, an address ID, a transmission source ID, and network information. In this case, in the frame type, information indicating a search response frame is written. In the address ID, identification information indicating the game apparatus 10 that has transmitted the search request frame is written. In the transmission source ID, identification information indicating the game apparatus 10 that transmits the search response frame D1b is written. In the network information, information about a network that the game apparatus 10 forms together with another game apparatus 10 is written based on the network information D7 stored in the data storage area 13b. Owing to the above structure, the game apparatus 10 that has received the search response frame D1b can obtain information about a network that other game apparatuses 10 form, and based on the information, can select another game apparatus 10 to be connected. It is noted that hereinafter, the transmission source ID and the network information may be collectively referred to as apparatus-related information.

The proxy response frame D1c is transmitted by the game apparatus 10 that has monitored the search response frame D1b, to another game apparatus 10 that is the destination of the monitored search response frame D1b. As shown in FIG. 7C, the proxy response frame D1c includes a frame type, an address ID, and proxy response information. In this case, in the frame type, information indicating a proxy response frame is written. In the address ID, identification information indicating the game apparatus 10 to which the monitored search response frame D1b is to be transmitted is written. In the proxy response information, apparatus-related information included in the monitored search response frame D1b, and apparatus-related information included in a search response signal to be transmitted by the game apparatus 10 that performs proxy response, are written. Owing to the structure of the proxy response frame D1c shown in FIG. 7C, the size of the transmission frame can be reduced.

Next, a process in which the game apparatus 10 monitors search response signals and proxy response signals transmitted from other game apparatuses 10, and a process in which the game apparatus 10 transmits a search response signal and a proxy response signal, will be described.

Figure 8:
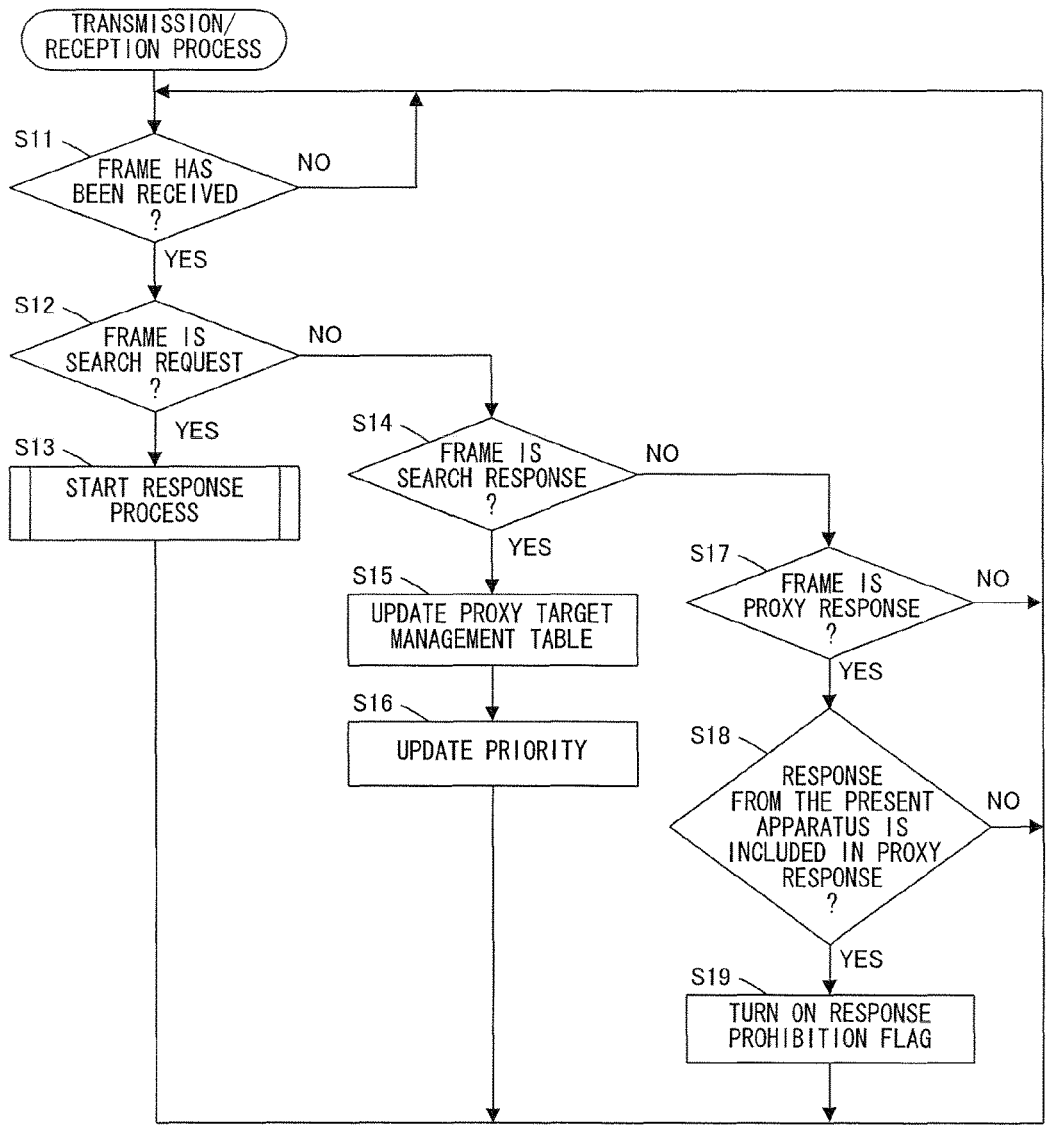
FIG. 8 is a flowchart showing a non-limiting example of a transmission/reception process of a search response signal and a proxy response. Signal.
Figure 9:
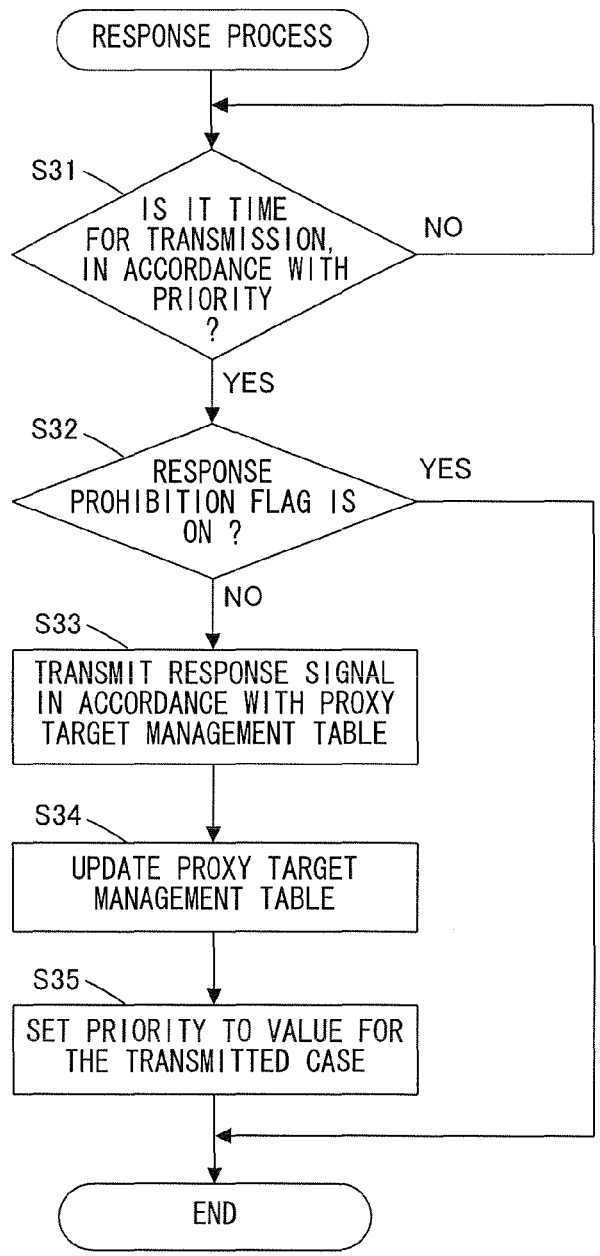
FIG. 9 is a flowchart showing another non-limiting example of a transmission/reception process of a search response signal and a proxy response signal.

Flowcharts of Transmission/Reception Processes of Search Response Signal and Proxy Response Signal With reference to FIG. 8 and FIG. 9, transmission/reception processes of a search response signal and a proxy response signal executed by the processor 11 of the game apparatus 10 will be described. The transmission/reception processes of a search response signal and a proxy response signal shown in FIG. 8 and FIG. 9 are executed by the processor 11 of the game apparatus 10 executing the wireless communication program P1. Hereinafter, the process executed by the game apparatus 10 (search subject communication apparatus; each of the game apparatuses A to I) that has received a search request signal from the game apparatus X (search communication apparatus) as shown in FIG. 2 will be described as an example.

At first, each of the game apparatuses 10 has been powered on, and is waiting to receive a signal in the communication enabled area of the game apparatus 10 by using a use channel (2Ch) designated by the processor 11 thereof. Then, in step S11, the processor 11 of the game apparatus 10 determines whether or not the game apparatus 10 has received a transmission frame from another game apparatus 10. If the result of the determination is YES, the process proceeds to step S12. If the result of the determination is NO, the process returns to step S11 to repeat processing of step S11 until the game apparatus 10 receives a transmission frame from another game apparatus 10.

In step S12, the processor 11 of the game apparatus 10 determines whether or not the received transmission frame is a search request signal. Specifically, the processor 11 of the game apparatus 10 determines whether or not the received transmission frame is the search request frame D1$a$, based on the frame type included in the received transmission frame. If the result of the determination is YES, the process proceeds to step S13 to start a response process. If the result of the determination is NO, the process proceeds to step S14.

Next, with reference to FIG. 9, the response process started in step S13 will be described. It is noted that the process shown in FIG. 9 is started in step S13 and is executed in parallel with the process shown in FIG. 8.

In step S31, the processor 11 of the game apparatus 10 determines whether or not it is time for the game apparatus 10 to transmit a search response signal or a proxy response signal in accordance with the priority. Specifically, the processor 11 of the game apparatus 10 determines whether or not it is time to transmit a search response signal or a proxy response signal, based on the priority information D6 stored in the main memory 13. It is noted that in the priority information D6, a reference priority (e.g., 5) is written as an initial value, and is updated in step S16 described later. In addition, if the priority is equal to that of another game apparatus, the processor 11 determines whether or not it is time to transmit a transmission frame, based on a waiting time which is randomly set in order to prevent collision of a plurality of transmission frames. If the result of the determination is YES, the process proceeds to step S32. If the result of the determination is NO, processing of step S31 is repeated (that is, the game apparatus 10 waits until the transmission timing corresponding to its priority comes).

In step S32, the processor 11 of the game apparatus 10 determines whether or not a response prohibition flag (not shown) stored in the main memory 13 is ON. It is noted that the response prohibition flag (not shown) is a flag for prohibiting transmission of a response signal (search response signal and proxy response signal) when the flag is ON. If the result of the determination is YES, the response process ends here. If the result of the determination is NO, the process proceeds to step S33.

In step S33, the processor 11 of the game apparatus 10 transmits a search response signal or a proxy response signal to the game apparatus X, based on the proxy target management table D8 for the game apparatus X stored in the main memory 13. Specifically, the processor 11 of the game apparatus 10 refers to the proxy target management table D8, and if there is an entry included in the proxy target management table D8 (another game apparatus 10 that is a proxy target is included), transmits a proxy response signal to the game apparatus X. More specifically, based on the search response frame D1$b$ that the other game apparatus 10 (proxy target) has transmitted to the game apparatus X, which has been monitored and stored in the reception frame buffer area D2, the processor 11 of the game apparatus 10 generates the proxy response frame D1$c$ and transmits the generated proxy response frame D1$c$ to the game apparatus X. On the other hand, referring to the proxy target management table D8, if there is no entry included or if the remaining numbers of times of proxy response for all entries are 0, the processor 11 of the game apparatus 10 transmits a search response signal to the game apparatus X. More specifically, the processor 11 of the game apparatus 10 transmits the search response frame D1$b$ stored in the transmission frame buffer area D1 of the game apparatus 10, to the game apparatus X. Then, the process proceeds to step S34.

In step S34, the processor 11 of the game apparatus 10 updates the proxy target management table D8 for the game apparatus X stored in the main memory 13. Specifically, if the processor 11 of the game apparatus 10 has transmitted a proxy response signal in step S33, the processor 11 decreases the remaining number of times of proxy response for the other game apparatus 10 that is a proxy target, for which the game apparatus 10 has transmitted the search response signal of the other game apparatus 10. If the processor 11 of the game apparatus 10 has not transmitted a proxy response signal, the processor 11 does not update the proxy target table D8. Then, the process proceeds to step S35.

In step S35, the processor 11 of the game apparatus 10 sets the priority information D6 stored in the main memory 13, at a value corresponding to the case where a response signal has been already transmitted. Specifically, the processor 11 of the game apparatus 10 sets the priority information D6 at a value (e.g., 3) lower than a reference value (a reference priority, e.g., 5). It is noted that the value may be a fixed value, or the more recent the time when the search response signal or the proxy response signal was transmitted is, the lower the value may be.

With reference to FIG. 8, in step S14, the processor 11 of the game apparatus 10 determines whether or not the received transmission frame is a search response signal. Specifically, the processor 11 of the game apparatus 10 determines whether or not the received transmission frame is the search response frame D1$b$, based on the frame type included in the received transmission frame. If the result of the determination is YES, the process proceeds to step S15. If the result of the determination is NO, the process proceeds to step S17.

In step S15, the processor 11 of the game apparatus 10 updates the proxy target management table D8 for the game apparatus X stored in the main memory 13. Specifically, the processor 11 of the game apparatus 10 compares the transmission source ID included in the received search request frame D1$a$ with the IDs of the game apparatuses 10 as proxy targets included in the proxy target management table D8. As a result, if the transmission source ID is not included among the IDs of the game apparatuses 10 that are proxy targets, the processor 11 newly registers the game apparatus 10 corresponding to the transmission source, as a proxy target. Then, the process proceeds to step S16.

In step S16, the processor 11 of the game apparatus 10 sets the priority information D6 stored in the main memory 13 at a value higher than the current priority in accordance with the increase in the number of the game apparatuses 10 as proxy targets included in the proxy target management table D8. Specifically, the more the number of the game apparatuses 10 as proxy targets included in the proxy target management table D8 is, the higher the priority information D6 is set to be (for example, the priority information D6 is set at 7 which is higher than the current priority, e.g., a reference value, 5). Therefore, for example, the priority information D6 (e.g., 8) of a game apparatus 10 having registered three game apparatuses as proxy targets is higher than the priority information D6 (e.g., 6) of another game apparatus 10 having registered one game apparatus as a proxy target. Then, the process returns to step S11.

It is noted that in step S16, in the case where the current priority (e.g., 3) is lower than the reference value (5) (that is, the current priority is a value for the case where a response signal has been already transmitted), the priority information D6 is set to be higher (e.g., 3.5) than the current priority but to be lower than the reference value (5). As a result, the priority (e.g., 3.5) of a game apparatus 10 that has transmitted a search response signal and has monitored another search response signal is lower than the priority (no less than the reference value, 5) of another game apparatus 10 that has not yet transmitted a search response signal, but higher than the priority (e.g., 3) of still another game apparatus 10 that has transmitted a search response signal and has not monitored another search response signal.

In step S17, the processor 11 of the game apparatus 10 determines whether or not the received transmission frame is a proxy response signal. Specifically, the processor 11 of the game apparatus 10 determines whether or not the received transmission frame is the proxy response frame D1c, based on the frame type included in the received transmission frame. If the result of the determination is YES, the process proceeds to step S18. If the result of the determination is NO, the process returns to step S11.

In step S18, the processor 11 of the game apparatus 10 deter lines whether or not a search response signal from the game apparatus 10 is included in the monitored proxy response signal. Specifically, the processor 11 of the game apparatus 10 determines whether or not the apparatus-related information about the game apparatus 10 is included in the received proxy response frame D1b. If the result of the determination is YES, the process proceeds to step S19. If the result of the determination is NO, the process returns to step S11.

In step S19, the processor 11 of the game apparatus 10 turns on the response prohibition flag (not shown) stored in the main memory 13. Then, the process returns to step S11.

It is noted that since the process shown in FIG. 8 and the process shown in FIG. 9 are executed in parallel as previously described, the game apparatus 10 can monitor signals transmitted from other game apparatuses 10 (execute step S11 in FIG. 8) until the transmission timing (step S31 in FIG. 9 determines YES).

Besides the above-described transmission/reception processes of a search response signal and a proxy response signal, (for example, as an interrupt process), the processor 11 of the game apparatus 10 execute a process of clearing (deleting) an entry in the proxy target management table D8 in accordance with a predetermined condition. For example, the processor 11 of the game apparatus 10 deletes a proxy target whose remaining number of times of proxy response is 0 in the proxy target management table D8 (that is, a proxy target for which proxy response has been performed a predetermined number of times). In addition, for example, the processor 11 of the game apparatus 10 deletes a proxy target registered in the proxy target management table D8 if a predetermined period has elapsed since it was registered. In addition, for example, the processor 11 of the game apparatus 10 calculates, from the radio wave reception intensity or a variation therein, the predetermined number of times of proxy response or the predetermined period from when a proxy target is registered, which is used as a reference for determining deletion of a proxy target. Specifically, the processor 11 of the game apparatus 10 calculates it such that the stronger the radio wave reception intensity is or the smaller the variation in the radio wave reception intensity is, the more the predetermined number of times is or the longer the predetermined period is. It is noted that the priority information D6 is also updated in accordance with clearance of an entry in the proxy target management table D8.

In addition, the processor 11 of the game apparatus 10 resets the response prohibition flag stored in the main memory 13 in accordance with a predetermined rule. For example, data of the response prohibition flag may be reset as the process shown in FIG. 9 is executed one time, or data of the response prohibition flag may be reset as the process shown in FIG. 9 is executed a predetermined number of times. More specifically, the predetermined number of times for resetting in the case where the communication condition of the game apparatus 10 frequently varies may be set to be smaller than in the case where the communication condition does not frequently vary.

In addition, the processor 11 of the game apparatus X receives a proxy response signal and a search response signal which have been transmitted as responses to a search request signal that the game apparatus X has transmitted, and stores the received signals in the main memory 13. Thus, the game apparatus X recognizes other game apparatuses 10.

In accordance with the above-described monitoring/transmission processes of a search response signal and a proxy response signal, the game apparatuses A to I in the communication system shown in FIG. 2 execute, for example, the following communication process.

For example, when the game apparatus A has received the first search request signal from the game apparatus X (YES in step S12 in FIG. 8), the game apparatus A determines whether or not it is time to transmit a search response signal, in accordance with the priority (in this case, the initial value of priority) (step S31 in FIG. 9). At this point of time, since all the priorities of the game apparatuses A to I are the same (for example, initial value of 5), the game apparatus A determines whether or not it is time to transmit a search response signal, in accordance with a randomly set waiting time. If the waiting time of the game apparatus A is the shortest and the transmission timing for the game apparatus A has come first (YES in step S31 in FIG. 9), since the response prohibition flag is not ON (NO in step S32 in FIG. 9), the game apparatus A refers to the proxy target management table D8. Then, since there is no entry of proxy target here, the game apparatus A transmits a search response signal (step S33 in FIG. 9), and sets the priority to be lower (for example, 3) than the reference value (initial value of 5) (step S35).

On the other hand, it will be assumed that the game apparatus B has not normally received the search request signal (NO in step S12 in FIG. 8). In this case, the game apparatus B monitors search response signals transmitted from other game apparatuses 10 (for example, game apparatus A) (YES in step S14 in FIG. 8), and registers a proxy target (game apparatus A) in the proxy target management table D8, based on the monitored search response signal (step S15 in FIG. 8). Then, since the game apparatus B has monitored a search response signal, the game apparatus B sets the priority to be higher (for example, 6) than the current value (reference value) (step S16 in FIG. 8) in order to have priority on the next transmission.

Then, for example, the game apparatus B monitors a search response signal transmitted from the game apparatus C (NO in step S12 and YES in step S14 in FIG. 8), and registers a proxy target (game apparatus C) in the proxy target management table D8, based on the monitored search response signal (step S15 in FIG. 8). Then, since the number of proxy targets increases, the game apparatus B sets the priority to be higher (for example, 7) than the current value (6) (step S16 in FIG. 8). Thus, the more search response signals the game apparatus 10 monitors, the more preferentially the game apparatus 10 can transmit a proxy response signal in the next transmission relative to other game apparatuses 10. In addition, the game apparatus X receives the proxy response signal, thereby recognizing the presences of a large number of search subject communication apparatuses in a short period, resulting in increase in efficiency of searching.

On the other hand, after the game apparatus A has transmitted the search response signal, the game apparatus A monitors a search response signal transmitted from, for example, the game apparatus C (NO in step S12 and YES in step S14 in FIG. 8), and registers a proxy target (game apparatus C) in the proxy target management table D8, based on the monitored search response signal (step S15 in FIG. 8). Then, the game apparatus A sets the priority to be higher (for example, 3.5) than the current value (3) (step S16 in FIG. 8). Therefore, in the next transmission by the game apparatus A, since its priority is lower than the reference value (5), other game apparatuses that have not yet transmitted search response signals (that have not yet been recognized) transmit in preference to the game apparatus A. Thus, the efficiency of searching by a search communication apparatus (game apparatus X) is increased.

Next, the game apparatuses A and B receive the second search request signal from the game apparatus X (YES in step S12 in FIG. 8). Then, the game apparatus B determines whether or not it is time to transmit a search response signal, based on the priority (in this case, 7) (step S31 in FIG. 9). Here, since the priority (7) of the game apparatus B is higher than those of the other game apparatuses (for example, 3.5 of the game apparatus A, or reference value of 5), the game apparatus B is prioritized so that the transmission timing of the game apparatus B comes first (YES in step S31 in FIG. 9). Then, since the response prohibition flag is not ON (NO in step S32 in FIG. 9), the game apparatus B refers to the proxy target management table D8, and transmits, as a proxy response signal, a search response signal of the game apparatus B and the search response signals of the game apparatuses A and C which are proxy targets, to the game apparatus X (step S33 in FIG. 9). Thus, even if the period (reception period) in which the game apparatus X can receive a response to a search request signal is short, the game apparatus X can recognize the presences of the game apparatuses A, B, and C by receiving the proxy response signal from the game apparatus B.

On the other hand, the game apparatus A determines whether or not it is time to transmit a search response signal, in accordance with the priority (in this case, 3.5) (step S31 in FIG. 9). Since the priority is 3.5, the transmission timing of the game apparatus A does not come soon (NO in step S31 in FIG. 9). Therefore, other game apparatuses 10 that have not yet transmitted search response signals and whose priorities are equal to the reference value (5) (for example, another game apparatus 10 that has newly appeared in the communication enabled area of the game apparatus X) preferentially transmit search response signals. Therefore, the efficiency of searching by the game apparatus X is increased.

On the other hand, it will be assumed that the game apparatus C has monitored the proxy response signal transmitted from the game apparatus B (NO in step S12, NO in step S14, and YES in step S17 in FIG. 8). Here, since the search response signal from the game apparatus C is included in the proxy response signal from the game apparatus B (YES in step S18 in FIG. 8), the response prohibition flag of the game apparatus C is turned on (step S19 in FIG. 8). Therefore, in the response process, the game apparatus C does not transmit a search response signal (step S33 is not executed because of YES in step S32 in FIG. 9). Thus, the game apparatus X can avoid redundantly receiving the same search response signals, whereby the efficiency of searching by the game apparatus X is increased. It is noted that the game apparatus C will next transmit a search response signal after the response prohibition flag is reset in accordance with a predetermined rule.

As described above, owing to the monitoring/transmission processes of a search response signal and a proxy response signal shown in FIG. 8 and FIG. 9, the game apparatus X (search communication apparatus) can efficiently search for a large number of game apparatuses in a short period by receiving a proxy response signal. In addition, the game apparatuses A to I (search subject communication apparatuses) can efficiently transmit search response signals and proxy response signals, avoiding redundant transmission. Thus, the efficiency of searching by a search communication apparatus is increased.

It is noted that the monitoring/transmission processes of a search response signal and a proxy response signal described in the above embodiment may be modified in various manners. In the above embodiment, the game apparatus 10 does not transmit a search response signal and a proxy response signal when the response prohibition flag is ON. However, for example, the game apparatus 10 may transmit a proxy response signal if there is an entry as a proxy target registered in the proxy target management table D8.

In addition, in the above embodiment, in the proxy target management table D8, the remaining numbers of times of proxy response are registered for the respective proxy targets. However, instead of registering the remaining numbers of time of proxy response, only proxy targets may be registered and the proxy targets may be all cleared when a predetermined period has elapsed.

In addition, in the transmission/reception process of the present embodiment shown in FIG. 8, even if the game apparatus 10 does not receive (or cannot normally receive) a search request signal from the game apparatus X, the game apparatus 10 monitors signals transmitted from other game apparatuses 10, and determines whether or not to transmit the monitored signal as a proxy response signal (step S14 etc.). However, the game apparatus 10 may not determine whether or not to transmit as a proxy response signal a monitored signal transmitted from another game apparatus 10, until the game apparatus 10 receives a search request signal from a search communication apparatus (game apparatus X).

In addition, in still another embodiment (modification), a process for searching for other communication apparatuses executed by the search communication apparatus (game apparatus X) may be composed of two steps having different purposes. That is, in the modification of the exemplary embodiments, in the first step, a search communication apparatus transmits a search request signal to search subject communication apparatuses (game apparatuses A to I) to allow them to establish proxy relationships therebetween, and in the second step, transmits a search request signal to receive proxy response signals from the search subject communication apparatuses that have established the proxy relationships. Specifically, in the first step, search subject communication apparatuses receive a search request signal transmitted from the game apparatus X, and transmit search response signals as responses to the search request signal. Then, the search subject communication apparatuses monitor the search response signals transmitted from each other, to become able to transmit the each others' search response signals in place of each other (establish proxy relationships). Here, in the first step, the search communication apparatus does not need to acquire the search result (does not need to receive search response signals) but only have to transmit a search request signal. Therefore, the time taken for the searching can be reduced. Next, in the second step, the search communication apparatus transmits a search request signal in order to receive search response signals (specifically, proxy response signals) from the search subject communication apparatuses. Here, the search subject communication apparatuses that have received the search request signal have already established the proxy relationships. Therefore, the search subject communication apparatuses transmit proxy response signals based on the priorities set in accordance with the numbers of proxy targets. Therefore, the search communication apparatus can recognize the presences of a plurality of communication apparatuses by receiving the proxy response signals, thus reducing the time taken for the searching. In this way, by executing the first step and the second step of searching having different purposes described above, the search communication apparatus can further reduce the time taken for the searching and increase the efficiency of searching.

In addition, in the above embodiment, the monitoring/transmission processes of a search response signal and a proxy response signal are executed with respect to one search communication apparatus (game apparatus X). However, in the case where a plurality of search communication apparatuses transmit search request signals, the above processes are executed with respect to each of the search communication apparatuses.

In addition, the priority (priority information D6) described in the above embodiment may be set by any other method. For example, the priority may be determined by a combination of conditions, i.e., the elapsed time from transmission of a search response signal and the number of proxy targets registered in the proxy target management table D8. In addition, in the above embodiment, the priority information D6 is set based on information about whether or not transmission has been done, and the number of proxy targets. However, the order of transmission of signals may be determined based on first priority information associated with the information about whether or not transmission has been done, and second priority information associated with the information about the number of proxy targets. Specifically, the order of transmission of signals may be determined based on the first priority information, and only if pieces of the first priority information are equal to each other between apparatuses, the second priority information may be used.

In addition, in the above embodiment, one channel (2Ch) is used as the search channel for the game apparatus X shown in FIG. 2, and the other game apparatuses A to I that use 2Ch are searched for. However, in a communication system including the game apparatuses 10, the channel used by each game apparatus 10 is selected from a plurality of predetermined channels in accordance with the ambient communication condition of the game apparatus 10. Therefore, the other game apparatuses 10 around the game apparatus X do not necessarily use the same channel as in the game apparatuses A to I, but may use different channels. In such a case, the game apparatus X may use a plurality of search channels to search for other game apparatuses 10 around the game apparatus X, and may search for other game apparatuses 10 that use the respective channels different from each other. Thus, even if a plurality of game apparatuses 10 that use different channels (for example, 2Ch and 3Ch) are present around the game apparatus X, the game apparatus X transmits a search request signal by using each of the different channels. Therefore, each of the game apparatuses 10 can receive the search request signal by using the corresponding channel, and transmit the corresponding search response signal. In addition, each of the game apparatuses 10 can monitor a search response signal transmitted from another game apparatus 10 that uses the same channel as the game apparatus 10, and transmit a proxy respond signal including the monitored signal. In this way, the game apparatus X can efficiently search for other game apparatuses 10, present around the game apparatus X, that use various channels.

In addition, in the above embodiment, network information is written in the search response frame D1b, that is, a search response signal includes information about a network formed by the game apparatus 10 that transmits the search response signal. However, other than such information, a search response signal may include any information. For example, a search response signal may include unique information such as the number of times the game apparatus 10 has previously communicated with the game apparatus X, and the game apparatus X that has received the information may determine to communicate with the game apparatus 10, based on the information. In addition, such information may be displayed on a display section (not shown) of the game apparatus 10, a user may select another game apparatus 10 based on the information, and the game apparatus 10 may establish communication with the other game apparatus that has been selected.

In addition, in the above embodiment, the transmission process of a search request signal, and the transmission process of a search response signal are executed by the processor 11 of the game apparatus 10 executing the wireless communication program P1. However, a circuit realizing such functions may execute the transmission processes.

In addition, in the communication system of the above embodiment, the game apparatuses 10 have the same configuration. However, a search communication apparatus (the game apparatus X shown in FIG. 2) that transmits a search request, and a search subject communication apparatus (the game apparatuses A to I shown in FIG. 2) that receives the search request may not have the same configuration. Specifically, a search communication apparatus may have at least a configuration to transmit a search request signal, and a search subject communication apparatus may have at least a configuration to receive the search request signal, to transmit a search response signal which is a response to the search request signal, and to monitor a signal around the search subject communication apparatus. Such configurations are applicable to, for example, a communication system in which a server as a search communication apparatus transmits a search request signal to terminal communication apparatuses as search subject communication apparatuses, and based on the search result, the server distributes data to the terminal communication apparatuses. Thus, the communication system of the above embodiment is not limited to including only a plurality of the game apparatuses 10, but may include the game apparatus 10 and an apparatus other than the game apparatus 10 (for example, a distribution server, an information processing apparatus, or a radio wave relay apparatus).

In addition, in the communication system of the above embodiment, the search subject communication apparatuses (game apparatuses A to I shown in FIG. 2) have the same configuration. However, all the search subject communication apparatuses do not necessarily have a configuration to monitor search response signals transmitted from other search subject communication apparatuses and to transmit a search subject proxy response signal. For example, only a search subject communication apparatus whose priority of transmission of a search response signal has been set at a low value in advance may have the configuration to monitor search response signals transmitted from other search subject communication apparatuses and to transmit a proxy response signal.

In addition, in the above embodiment, the transmission process of a search request signal or the transmission process of a search response signal is executed by one game apparatus 10. However, a part or the whole of each process may be executed by one or more other apparatuses (for example, a centralized control system) that can perform wired or wireless communication.

In addition, the configuration of the game apparatus 10 described in the above embodiment is merely an example. The game apparatus 10 may have a configuration other than the above configuration. The setting values used in the game apparatus 10, values used in the determinations, the order of steps of the processes executed by the game apparatus 10, and the like are merely examples. Another order of steps or other values may be used.

In addition, in the above embodiment, the wireless communication program to be executed by the game apparatus 10 is supplied to the game apparatus 10 via a storage medium such as the storage device 12. However, the wireless communication program may be supplied to the game apparatus 10 via a communication line. It is noted that instead of a nonvolatile storage memory, a CD-ROM, a DVD, a similar optical disc storage medium, a flexible disc, a hard disc, an optical magnetic disc, a magnetic tape, or the like may be used as an information storage medium for storing the wireless communication program. In addition, a volatile memory for temporarily storing the wireless communication program may be used as an information storage medium for storing the wireless communication program.

While the exemplary embodiments have been described in detail, the foregoing description is in all aspects illustrative and not restrictive. It will be understood that numerous other modifications and variations can be devised.

What is claimed is:

1. A communication system including: a search communication apparatus which searches for another communication apparatus; and a plurality of search subject communication apparatuses which are searched for by the search communication apparatus, the search communication apparatus comprising a search request transmission section configured to transmit a search request signal, the search subject communication apparatuses each comprising:
a search request reception section configured to receive the search request signal transmitted from the search communication apparatus;
a priority setting section configured to set a priority of transmission of a search response signal that is a response to the search request signal; and
a search response transmission section configured to transmit the search response signal to the search communication apparatus according to the priority set by the priority setting section, and the search communication apparatus further comprising a search response reception section configured to receive the search response signal transmitted from each search subject communication apparatus, wherein the priority setting section of a first search subject communication apparatus is configured to set the priority of transmission for the search response signal from the first search subject communication apparatus based on identification information received from at least a second search subject communication apparatus that is different from the first search subject communication apparatus.

2. The communication system according to claim 1, wherein
the priority setting section includes a priority updating section configured to repeatedly update the priority.

3. The communication system according to claim 1, wherein
the search response signal includes identification information of the search subject communication apparatus,
each search subject communication apparatus further includes a search response monitoring section configured to monitor the search response signal transmitted from another search subject communication apparatus to the search communication apparatus, and
the priority setting section sets the priority based on the identification information included in the search response signal that is monitored by the search response monitoring section.

4. The communication system according to claim 1, wherein
the priority setting means sets the priority based on the number of pieces of the identification information of the other search subject communication apparatuses.

5. The communication system according to claim 4, wherein the priority setting section increases the priority as a greater number of pieces of the identification information are received.

6. The communication system according to claim 1, wherein
the priority setting section sets the priority according to a state of transmission from a corresponding one of the search subject communication apparatuses to the search communication apparatus.

7. The communication system according to claim 6, wherein
if the search subject communication apparatus has transmitted the search response signal to the search communication apparatus at least one time, the priority setting section sets the priority to be lower than if the search subject communication apparatus has not transmitted the search response signal.

8. The communication system according to claim 1, wherein
the search response transmission section transmits the search response signal based on the priority set by the priority setting section and a waiting time that is randomly set.

9. The communication system according to claim 1, wherein
the priority setting section sets first priority information and second priority information different from the first priority information and
the search response transmission section transmits the search response signal in order of transmission based on the first priority information and the second priority information.

10. A communication method performed by a communication system that includes a search communication apparatus which searches for another communication apparatus and a plurality of search subject communication apparatuses which are searched for by the search communication apparatus, the method comprising:
a search request transmission step of transmitting a search request signal by the search communication apparatus;
a search request reception step of receiving, by each of the search subject communication apparatuses, the search request signal transmitted from the search communication apparatus;
a priority setting step of setting, by each of the search subject communication apparatuses, a priority of transmission of a search response signal that is a response to the search request signal;
a search response transmission step of transmitting, by each of the search subject communication apparatuses, the search response signal to the search communication apparatus according to the priority set in the priority setting step; and
a search response reception step of receiving, by the search communication apparatus, the search response signal transmitted from each of the search subject communication apparatuses,
wherein the priority setting section of a first search subject communication apparatus is configured to set the priority of transmission for the search response signal from the first search subject communication apparatus based on identification information received from at least a second search subject communication apparatus that is different from the first search subject communication apparatus.

11. A communication system comprising:
a search communication apparatus that includes a wireless transceiver and at least one hardware processor, the at least one hardware processor configured to transmit, by using the wireless transceiver, a search request signal; and
a plurality of search subject communication apparatuses that each comprise a corresponding wireless transceiver and at least one corresponding hardware processor, the at least one corresponding hardware processor configured to:
receive, via the corresponding wireless transceiver, the search request signal transmitted from the search communication apparatus,
generate a search response that is a response to the received search request signal and set a priority for the search response,
transmit the search response as a search response signal, by using the corresponding wireless transceiver, to the search communication apparatus according to the set priority for the search response, and
wherein the at least one hardware processor of the search communication apparatus is further configured to receive, by using the transceiver of the search communication apparatus, the search response signal transmitted from each one of the plurality of search subject communication apparatuses,
wherein the priority setting section of a first search subject communication apparatus is configured to set the priority of transmission for the search response signal transmitted from the first search subject communication apparatus based on identification information received from at least a second search subject communication apparatus that is different from the first search subject communication apparatus.

* * * * *